United States Patent [19]

Paspek et al.

[11] Patent Number: 4,824,555
[45] Date of Patent: Apr. 25, 1989

[54] EXTRACTION OF OIL FROM STABLE OIL-WATER EMULSIONS

[75] Inventors: Stephen C. Paspek, North Royalton; Christopher P. Eppig, Cleveland Hts., both of Ohio

[73] Assignee: The Standard Oil Company, Cleveland, Ohio

[21] Appl. No.: 71,433

[22] Filed: Jul. 9, 1987

[51] Int. Cl.[4] ............................................. C10G 33/00
[52] U.S. Cl. ................................. 208/187; 208/188; 208/309; 208/311; 208/320; 210/708; 196/145.2; 585/800; 585/802; 175/206; 175/207

[58] Field of Search ................ 208/187, 309, 188; 210/708, 741

[56] References Cited

U.S. PATENT DOCUMENTS

| | | | |
|---|---|---|---|
| Re 31,913 | 6/1985 | Barger | 422/267 |
| 2,037,218 | 4/1936 | Empson | 210/708 |
| 2,235,639 | 3/1941 | Koch et al. | 196/5 |
| 2,383,362 | 8/1945 | Batchelder | 196/5 |
| 2,383,363 | 8/1945 | Batchelder | 196/4 |
| 2,454,653 | 11/1948 | Kamp | 210/741 |
| 3,184,401 | 5/1965 | Gorin | 208/8 |
| 3,202,605 | 8/1965 | Redcay | 208/309 |
| 3,417,014 | 12/1968 | Lumpkin | 208/187 |
| 3,441,499 | 4/1969 | Frances, Jr. et al. | 208/187 |
| 3,506,564 | 4/1970 | Cone | 208/33 |
| 3,696,021 | 10/1972 | Cole et al. | 208/13 |
| 3,711,400 | 1/1973 | Cole et al. | 210/21 |
| 3,997,425 | 12/1976 | Gatsis et al. | 208/8 |
| 4,017,383 | 4/1977 | Beavon | 208/309 |
| 4,035,281 | 7/1977 | Espenscheid et al. | 208/8 |
| 4,073,719 | 2/1978 | Whisman et al. | 208/180 |
| 4,075,080 | 2/1978 | Gorin | 208/8 |
| 4,079,004 | 3/1978 | Tan et al. | 210/52 |
| 4,079,005 | 3/1978 | Tan et al. | 210/52 |
| 4,081,360 | 3/1978 | Tan et al. | 208/8 |
| 4,094,781 | 6/1978 | Snell et al. | 210/54 |
| 4,124,486 | 11/1978 | Nolley, Jr. | 208/309 |
| 4,224,136 | 9/1980 | Zu Köcker et al. | 208/8 LE |
| 4,260,473 | 4/1981 | Bauer | 208/14 |
| 4,273,644 | 6/1981 | Harris et al. | 208/309 |

(List continued on next page.)

FOREIGN PATENT DOCUMENTS

2033244 5/1980 United Kingdom .

OTHER PUBLICATIONS

Kingsley, George S., "Pilot Plant Evaluation of Critical Fluid Extractions for Environmental Applications", Critical Fluid Systems, Inc. Epa Contract No. 68-0-2-3924, Epa/600/2-85/081, Jul., 1985, pp. 1-83.
Mitchell, David L. et al., "The Solubility of Asphaltenes in Hydrocarbon Solvents", Fuel, vol. 52, Apr. 1978, pp. 149-152.

Primary Examiner—Patrick P. Garvin
Assistant Examiner—Helane Myers
Attorney, Agent, or Firm—Larry W. Evans; Joseph G. Curatolo; Teresan W. Gilbert

[57] ABSTRACT

The present invention provides a facile method of oil removal from an oil-water emulsion containing suspended solid particulates. In general, the method utilizes a volatile solvent which is liquefied under pressure and forms a two-phase system when in contact with the emulsion. More particularly, the process of the present invention comprises the steps of (A) introducing said emulsion into a vessel in an extraction system,
(B) pressurizing the vessel with a volatile hydrocarbon whereby said volatile hydrocarbon is in the liquefied state and forms a two-phase system with said emulsion,
(C) maintaining said pressure for a period of time sufficient to effect the replacement of at least some of the oil in the emulsion phase with said volatile hydrocarbon, the replaced oil being dissolved in the volatile hydrocarbon phase,
(D) withdrawing at least a portion of said oil-containing hydrocarbon phase while maintaining the pressure on the two-phase system,
(E) reducing the pressure on the two-phase system whereby hydrocarbon dissolved in the emulsion is vaporized, and the emulsion separates into a water phase and an oil phase, and
(F) recovering the oil phase from the water phase.

19 Claims, 1 Drawing Sheet

U.S. PATENT DOCUMENTS

| | | | |
|---|---|---|---|
| 4,311,561 | 1/1982 | Hastings | 196/14.52 |
| 4,335,001 | 6/1982 | Yves et al. | 210/708 |
| 4,341,619 | 7/1982 | Poska | 208/11 LE |
| 4,354,928 | 10/1982 | Audeh et al. | 208/309 |
| 4,374,015 | 2/1983 | Brulé | 208/8 LE |
| 4,415,442 | 11/1983 | Rhodes | 208/177 |
| 4,416,764 | 11/1983 | Gikis et al. | 208/11 LE |
| 4,434,028 | 2/1984 | Eppig | 196/14.52 |
| 4,444,654 | 4/1984 | Cargle et al. | 208/187 |
| 4,450,067 | 5/1984 | Angevine et al. | 208/86 |
| 4,476,012 | 10/1984 | Gatsis | 208/251 R |
| 4,502,944 | 3/1985 | Nelson | 208/309 |
| 4,517,099 | 5/1985 | Brackneo | 210/741 |
| 4,536,283 | 8/1985 | Davis | 208/309 |
| 4,572,777 | 2/1986 | Peck | 208/11 LE |
| 4,634,520 | 1/1987 | Angelov et al. | 208/309 |
| 4,664,788 | 5/1987 | Gir et al. | 208/415 |
| 4,675,101 | 6/1987 | Warzinski | 208/311 |
| 4,722,781 | 2/1988 | Swartz et al. | 208/189 |

EXTRACTION OF OIL FROM STABLE OIL-WATER EMULSIONS

TECHNICAL FIELD OF THE INVENTION

This invention relates to the process for extracting oil from oil-water emulsions. More particularly, the invention relates to a process of extracting oil from oil-water emulsions containing suspended solid particulates through the use of a liquefied volatile hydrocarbon at an elevated pressure. The invention also relates to a process of breaking stable oil-water emulsions.

BACKGROUND OF THE INVENTION

Stable oil-water emulsions have been a problem in many areas of the petroleum industry. In the production of oil under water-flood conditions, oil-water emulsions are obtained from the production wells. These emulsions must be broken in order to recover the oil in useful form. When cleaning oil tanker bilges, oil-water emulsions frequently form and present disposal problems. In the processing of crude oils, such as by desalting, stable emulsion layers are formed in the desalter resulting in the waste of valuable oil and the creation of a disposal problem.

The stability of oil-water emulsions such as those described above is increased by the presence of fine suspended particles. It is recognized that the stability of oil-water-solid emulsions is a function of the composition, i.e., the relative amounts of oil, water and solids in the mixture as well as the type of oil and solids. The breaking of such emulsions requires alteration of this ratio. If the emulsion is classified as "water-in-oil", then the addition of miscible hydrocarbons to the emulsion generally only serves to swell the emulsion phase and does not lead to emulsion breaking. Thus, simple techniques such as diluting the emulsion with naphtha does not lead to the desired result. Removal of solids by filtration has a tendency to break the emulsion, but generally, since the emulsions are so viscous, filtration is extremely difficult. Centrifugation of oil-water-solid emulsions results in rather poor separation.

U.S. Pat. No. 2,235,639 describes a procedure for the resolution of oil and water emulsions by adding a liquefied gas (such as ethane, butane, propane, etc.) to the emulsion. A liquefied gas is added to the emulsion under sufficient pressure to prevent vaporization of the gas. While the mixture is under pressure, the emulsion breaks, and water settles from the emulsion leaving the oil in a purified condition. While still under pressure, water is withdrawn and the oil is transferred to a secondary zone where it is heated to volatilize the hydrocarbon gas.

U.S. Pat. Nos. 2,383,362 and 2,383,363 describe processes for the separation of water from hydrocarbon-water emulsions. More particularly, these patents relate to the breaking of tar emulsions and the separation of the water from the tar component by mixing a liquefied normally gaseous hydrocarbon solvent with the emulsions. The '362 patent is directed primarily to the use of propane whereas the '363 patent utilizes pentane as the liquid phase hydrocarbon.

U.S. Pat. No. 3,696,021 describes the separation of oily sludges by mixing the sludges with a light hydrocarbon to form an oil-hydrocarbon phase and a water-solids phase. The oil-hydrocarbon phase then is heated to an elevated temperature to remove the light hydrocarbons which may be recycled, and the oil is recovered for further use. The light hydrocarbons disclosed as being suitable for use in the process include propane, butane, pentane, as well as mixtures and isomers thereof.

SUMMARY OF THE INVENTION

The present invention provides a facile method of oil removal from an oil-water emulsion containing suspended solid particulates. The invention also provides a method of breaking stable oil-water emulsions. In general, the method utilizes a volatile solvent which is liquefied under pressure and forms a two-phase system when in contact with the emulsion. More particularly, the process of the present invention comprises the steps of (A) introducing said emulsion into a vessel in an extraction system, (B) pressurizing the vessel with a volatile hydrocarbon whereby said volatile hydrocarbon is in the liquefied state and forms a two-phase system with said emulsion, (C) maintaining said pressure for a period of time sufficient to effect the replacement of at least some of the oil in the emulsion phase with said volatile hydrocarbon, the replaced oil being dissolved in the volatile hydrocarbon phase, (D) withdrawing at least a portion of said oil-containing volatile hydrocarbon phase while maintaining the pressure on the two-phase system.

(E) reducing the pressure on the two-phase system whereby volatile hydrocarbon dissolved in the emulsion is vaporized, and the emulsion separates into a water phase and an oil phase, and (F) recovering the oil phase from the water phase.

DESCRIPTION OF THE PREFERRED EMBODIMENTS

Figure 1:
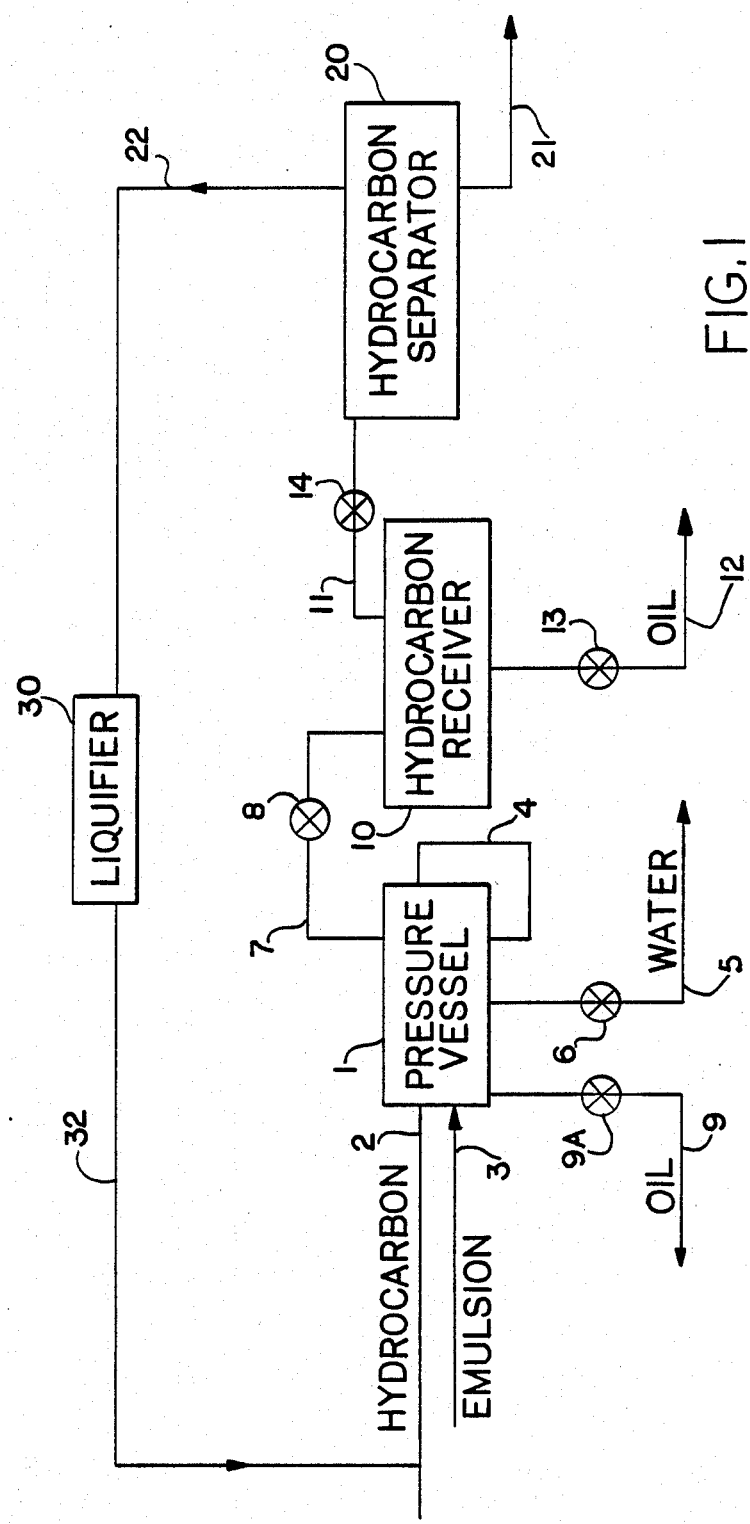
FIG. 1 is a flow sheet illustrating one embodiment of the process of the invention.

The oil-water emulsions which are treated in accordance with the method of the present invention are oil-water emulsions which contain suspended solid particulates. The presence of the suspended solid particulates makes it particularly difficult to break the emulsion, and therefore, it is difficult to process such emulsions for the purpose of recovering the oil. The oil-water-particulate emulsions which can be treated in accordance with the method of the present invention may be derived from a variety of sources within the petroleum industry. The oil-water-particulate emulsion may be obtained under water-flood conditions from production wells. Another significant source of such emulsions is from the desalting of crude oil. Stable emulsion layers form in the desalter which, if not broken, must be disposed and results in the waste of valuable oil.

Emulsions which can be treated in accordance with the process of this invention will contain varying amounts of oil, water and particulate solids. For example, such emulsions may contain from 30 to 45% by weight of oil, 50 to 65% by weight of water and up to about 10% by weight of solids. A particular example of an emulsion which can be treated in the process of the present invention comprises about 40% by weight of oil, about 55% by weight of water and about 5% by weight of particulate solids.

The volatile hydrocarbons which are utilized in the extraction system of the invention are hydrocarbons which can be liquefied under pressure and which will form a two-phase system with said emulsion. Moreover, the useful hydrocarbons are those which are capable of displacing or replacing at least some of the oil in the emulsions. The hydrocarbons are also preferably those which can be easily recovered once the inventive process is completed. The hydrocarbon can be selected from a number of light hydrocarbons, halo-hydrocarbons, or mixtures thereof. The optimum hydrocarbon will represent a balance between the hydrocarbon cost, processing cost, and oil solubility. The choice of hydrocarbon also will vary depending upon the physical and chemical properties of the emulsion and the hydrocarbon phase in the emulsion. A selection of a suitable hydrocarbon can be readily made by one skilled in the art. If the hydrocarbon is a gas at ambient conditions, then the final flashing will simply involve the release of the pressure. If the hydrocarbon is a liquid at ambient conditions, then the final flashing will require the application of a vacuum, or heat, or both.

The volatile hydrocarbons useful in the process of the present invention include aliphatic as well as cycloaliphatic hydrocarbons and generally will contain up to about 5 carbon atoms. Examples include propane, cyclopropane, propylene, butane, isobutane, cyclobutane, the butenes (and mixtures of butenes) and mixtures of these compounds. In one preferred embodiment, the volatile hydrocarbon is propane.

The volatile hydrocarbons useful in the present invention also may be halogenated aliphatic or cycloaliphatic hydrocarbons such as 2-chloropropane, chloroethane, methylene chloride, Freons such as Freon 12 and Freon 22, etc.

The amount of volatile hydrocarbons utilized in the process of the present invention may be varied although the amount of volatile hydrocarbons introduced into the extraction systems should be sufficient to provide a liquid phase above the emulsion phase, and the amount should further be sufficient to displace or replace at least some of the oil in the emulsion while still maintaining a hydrocarbon phase above the emulsion in the pressurized vessel. In accordance with one embodiment of the present invention which is a continuous or semi-continuous process, as the upper hydrocarbon phase is removed from the pressurized vessel, additional volatile hydrocarbon is added to the reaction vessel. Although the amount of volatile hydrocarbon utilized in the process can be varied over a wide range, the amount of hydrocarbon utilized in the process will be determined by the size of the pressure vessel, the cost of the volatile hydrocarbon, and the solubility of the oil in the hydrocarbon. Such amounts can be readily determined by one skilled in the art.

One embodiment of the process of the present invention is illustrated in the attached drawing.

Pressure vessel 1 is provided with a liquefied hydrocarbon supply inlet 2 and an emulsion supply inlet 3. Pressure vessel 1 is equipped with a positive pressure pump (not shown) to pressurize the system to the desired pressure to insure that the liquefied hydrocarbon is maintained in liquefied form for the desired period of time. Generally, the contents of pressure vessel 1 will be maintained at a pressure of from about 80 to about 150 psig, and more generally at a pressure of from about 100 to about 150 psig. At these pressures, the liquefied hydrocarbon and the emulsion form a two-phase system within pressure vessel 1. The top phase is rich in volatile hydrocarbon, while the bottom phase contains some of the oil and nearly all of the water. The contact between the liquefied hydrocarbon and the emulsion in pressure vessel 1 is maintained for a period of time which is sufficient to effect the replacement of at least some of the oil in the emulsion phase by said hydrocarbon. The oil which is replaced (or displaced) from the emulsion phase is dissolved in the hydrocarbon phase. The pressure within the pressure vessel also is maintained for the same period of time to insure that the two-phase system within the pressure vessel is maintained, and the emulsion is not broken. The progress of the process of the present invention can be observed through a sight glass 4.

When contact between the hydrocarbon phase and the emulsion phase has been sufficient to provide the desired amount of oil in the hydrocarbon phase, at least some of the hydrocarbon phase can be withdrawn from the pressure vessel through exit 7 and valve 8. The oil-containing hydrocarbon withdrawn from pressure vessel 1 is fed to hydrocarbon receiver 10 which is maintained at about atmospheric pressure. The oil can be separated from the hydrocarbon in receiver vessel 10 by any means known to those skilled in the art. If the hydrocarbon is a gas at ambient conditions, removal of the hydrocarbon can be effected by reducing the pressure within the hydrocarbon receiver 10 to atmospheric pressure, or lower, and opening valve 14. The hydrocarbon then proceeds to hydrocarbon separator 20 through pipe 11. If the hydrocarbon contained in receiver 10 is a liquid at ambient conditions, the hydrocarbon can be removed through pipe 11 by the application of a vacuum or by heating the contents of receiver 10, or both.

The oil which is removed from the emulsion in pressure vessel 1, and separated from the hydrocarbon in receiver 10 may be recovered from receiver 10 by opening valve 13. The oil recovered from receiver 10 generally will be free of any solid particulates originally contained in the emulsion and will be substantially free of water.

As the oil-containing volatile hydrocarbon is removed from pressure vessel 1 through pipe 7 as described above, additional hydrocarbons can be introduced into the pressure vessel to maintain a hydrocarbon phase above the emulsion phase. Additional emulsion can be introduced into pressure vessel 1 through inlet 3, and the process can be conducted in a continuous manner by maintaining the pressure within pressure vessel 1 and withdrawing at least a portion of the oil-containing hydrocarbon phase through pipe 7.

After at least some of the oil in the emulsion phase has been replaced by the volatile hydrocarbon, the pressure within pressure vessel 1 can be reduced either partially or completely to atmospheric pressure, and the hydrocarbon phase which has not been removed as well as any hydrocarbon dissolved in the emulsion is vaporized. When the hydrocarbon (or at least some of the hydrocarbon) in the emulsion is removed, the emulsion separates into a water phase and an oil phase. As mentioned above, if the hydrocarbon is not a gas at ambient temperature and pressure, removal of the hydrocarbon can be effected by applying a vacuum, or heat, or both.

The water phase is removed from pressure vessel 1 through pipe 5 by opening valve 6. The oil phase is removed from pressure vessel 1 through pipe 9 by opening valve 9A. The oil recovered through pipe 9 which is substantially water-free can be further processed as desired.

The volatile hydrocarbon which is recovered from receiver 10 through pipe 11 can either be discarded or processed so that it can be reused in the process of the invention. For example, with reference to FIG. 1, the hydrocarbon recovered from receiver 10 through pipe 11 can be fed to a hydrocarbon separator 20 where impurities are separated from the hydrocarbon and withdrawn through pipe 21. The purified hydrocarbon can then be fed through pipe 22 to a liquefier 30, and the liquefied hydrocarbon returned to pressure vessel 1 through pipe 32 and inlet 2.

The solid particulates may be in either the water phase or the oil phase depending on whether the particles are hydrophobic or hydrophilic. In any event, the particles can now be separated easily from the oil or the water phases by filtration.

The following examples illustrate the process of the present invention. Unless otherwise indicated in the examples, or elsewhere in the specification and claims, all parts and percentages are by weight and all temperatures are in degrees centigrade. In the following experiments, the emulsion used is obtained from a refinery desalter, and analysis indicates the emulsion contains about 40% by weight of oil, about 55% by weight of water and about 5% by weight of solids.

EXAMPLE 1

An emulsion (85 parts) is loaded into a sight glass gauge extractor with a volume of about 160 cc. The extractor is attached to an extraction system which comprises the sight glass gauge extractor, an inlet valve for introducing propane and an exit valve leading to a receiver. This apparatus is similar in principle to the apparatus shown in FIG. 1.

The system is slowly pressurized with propane gas up to about 110 psig, and further propane addition results in the liquefaction of the gas at constant pressure. When sufficient propane has been added to fill the gauge, the emulsion-propane interface level is measured, and it is observed that the emulsion phase has swelled by about 10% by volume due to propane dissolution. There is no indication of water separation at this time.

The propane inlet valve is closed, and the exit valve is cracked open to depressurize the system and remove propane. The propane containing some oil is collected in a receiver. As the pressure within the system reaches atmospheric pressure or higher, a separate water phase is formed in the bottom of the extractor. This water phase accounts for about 40% of the water in the emulsion. The water phase is crystal clear. This example illustrates that the removal of a small amount of oil from the emulsion is sufficient to break the emulsion when the pressure is returned to atmospheric pressure.

EXAMPLE 2

An 85-gram charge of the emulsion is loaded into a sight glass gauge extractor contained in an extraction system as described in Example 1. The system is slowly pressurized with propane gas up to about 110 psig, and further propane addition results in the liquefaction of the gas at constant pressure. When sufficient propane has been added to fill the gauge, the emulsion-propane interface level is measured, and the measurement indicates that the emulsion phase has swelled by about 10% by volume due to propane dissolution. There is no indication of water separation.

With the propane inlet valve still open, the exit valve is cracked open to begin the propane extraction cycle. Oil appears in the receiver as the propane evaporates from the receiver. The rate of oil extraction, after an initial sharp increase, begins to decline. After a total of 12 liters of propane (about 24 grams) has been passed through the extractor, the rate of oil extraction falls to nearly zero which indicates that virtually all of the propane-soluble species has been removed. This extracted oil represents about 20% by weight of the total oil in the emulsion. Again, there is no indication of water separation in the extractor. The emulsion has not broken.

The propane inlet valve then is closed while the exit valve is left open to depressurize the system. As the system pressure returns to ambient, the emulsion suddenly separates into an upper oil phase and a lower water phase. The water phase is recovered and is found to contain more than 98% of the total water originally contained in the emulsion. The water phase is crystal clear. The upper oil phase can be recovered from the extractor.

Experiment A (Comparative):

A portion of the emulsion described above and used in Examples 1 and 2 is mixed with an equal volume of pentane at ambient conditions. A single phase system results, and there is no evidence of water separation.

Experiment B (Comparative):

A portion of the emulsion as described above and used in Examples 1 and 2 is mixed with an equal volume of water. The added water is not miscible with the emulsion and does not cause any water to be rejected from the emulsion.

The above examples indicate that the removal of a small amount of oil from the emulsions by propane extraction results in the rejection of a small amount of water from the emulsion. The removal of a larger amount of oil from the emulsion results in a rejection of a substantial amount of water. In particular, Example 2 illustrates that the removal of as little as 20% of the total oil in the emulsion leads to complete phase separation and rejection of almost all of the water contained in the emulsion.

While the invention has been explained in relation to its preferred embodiment, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process of extracting oil from oil-water emulsions containing suspended solid particulates comprising the steps of:
   (A) introducing said emulsion into a vessel,
   (B) pressurizing the vessel by adding a volatile hydrocarbon whereby said volatile hydrocarbon in the vessel is in the liquefied state and forms a two-phase system with said emulsion,
   (C) maintaining said pressure for a period of time sufficient to effect the displacement of at least some of the oil in the emulsion phase with said volatile hydrocarbon, the displaced oil being dissolved in the volatile hydrocarbon phase, (D) withdrawing at least a portion of said oil-containing volatile hydrocarbon phase while maintaining the pressure on the two-phase system, (E) reducing the pressure on the two-phase system whereby volatile hydrocarbon dissolved in the emulsion is vaporized, and the emulsion separates into a water phase and an oil phase, and (F) recovering the oil phase from the water phase.

2. The process of claim 1 wherein the volatile hydrocarbon contains up to about 5 carbon atoms selected from the group consisting of hydrocarbons, halohydrocarbons, and mixtures thereof.

3. The process of claim 1 wherein the volatile hydrocarbon is propane.

4. The process of claim 1 wherein the pressure on the two-phase system in steps (B), (C) and (D) is from about 80 to about 150 psig.

5. The process of claim 1 wherein
(G) oil is recovered from the volatile hydrocarbon phase withdrawn in step (D).

6. The process of claim 1 wherein the oil-water emulsion comprises about 30 to 45% by weight of oil, from about 50 to 65% by weight of water and up to about 10% by weight of solids.

7. The process of claim 1 wherein the oil-water emulsion comprises about 40% by weight of oil, about 55% by weight of water and about 5% by weight of solids.

8. The process of claim 7 wherein the volatile hydrocarbon is propane and the vessel is pressurized at a pressure of about 100–150 psig.

9. A process for extracting oil from stable oil-water emulsions containing suspended solid particulates comprising the steps of
(A) introducing said emulsion into a vessel,
(B) pressurizing said vessel by adding a volatile hydrocarbon whereby said volatile hydrocarbon in the vessel is in the liquefied state and forms a two-phase system with said emulsion in said vessel, and whereby at least some of the oil in the emulsion is displaced by some of the volatile hydrocarbon, and the displaced oil dissolves in the volatile hydrocarbon phase,
(C) maintaining the pressure on the two-phase system by introducing additional volatile hydrocarbon into the vessel as needed while withdrawing at least a portion of the oil-containing volatile hydrocarbon from the vessel and from the system,
(D) reducing the pressure on the two-phase system whereby volatile hydrocarbon dissolved in the emulsion is varporized or removed, and the emulsion separates into a water phase and an oil phase, and
(E) recovering the oil phase from the water phase.

10. The process of claim 9 wherein (F) oil is recovered from the oil-containing volatile hydrocarbon withdrawn from the vessel in step (C).

11. The process of claim 9 conducted at about ambient temperature.

12. The process of claim 10 wherein the oil is recovered in step (F) by vaporizing the hydrocarbon.

13. The process of claim 9 wherein the volatile hydrocarbon is an aliphatic hydrocarbon containing up to about 15 carbon atoms.

14. The process of claim 9 wherein the volatile hydrocarbon is propane.

15. The process of claim 14 wherein the pressure on the two-phase system in steps (B) and (C) is about 80 to about 150 psig.

16. The process of claim 9 wherein the emulsion comprises about 30 to 45% by weight of oil, from about 50 to 65% by weight of water and up to about 10% by weight of solids.

17. The process of claim 9 wherein the oil-water emulsion comprises about 40% by weight of oil, about 55% by weight of water and about 5% by weight of solids.

18. A process of extracting oil from oil-water emulsions containing suspended solid particulates comprising the steps of:
(A) introducing said emulsion into a vessel,
(B) pressurizing the vessel by adding a volatile hydrocarbon whereby said volatile hydrocarbon in the vessel is in the liquefied state and forms a two-phase system with said emulsion,
(C) maintaining said pressure for a period of time sufficient to effect the displacement of at least some of the oil in the emulsion phase wth said volatile hydrocarbon, the displaced oil being dissolved in the volatile hydrocarbon phase,
(D) withdrawing at least a portion of said oil-containing volatile hydrocarbon phase while maintaining the pressure on the two-phase system,
(E) reducing the pressure on the two-phase system whereby volatile hydrocarbon dissolved in the emulsion is vaporized, and the emulsion separates into a water phase and an oil phase,
(F) recovering the oil phase from the water phase, and
(G) separating said solid particulates from said oil phase or said water phase.

19. A process for extracting oil from stable oil-water emulsions containing suspended solid particulates comprising the steps of
(A) introducing said emulsions into a vessel,
(B) pressurizing said vessel by adding a volatile hydrocarbon whereby said volatile hydrocarbon is in the liquefied state and forms a two-phase system with said emulsion in said vessel, and whereby at least some of the oil in the emulsion is displaced by some of the volatile hydrocarbon, and the displaced oil dissolves in the volatile hydrocarbon phase,
(C) maintaining the pressure on the two-phase system by introducing additional volatile hydrocarbon into the vessel as needed while withdrawing at least a portion of the oil-containing volatile hydrocarbon from the vessel and from the system,
(D) reducing the pressure on the two-phase system whereby volatile hydrocarbon dissolved in the emulsion is vaporized or removed, and the emulsion separates into a water phase and an oil phase,
(E) recovering the oil phase from the water phase, and
(F) separating said solid particulates from said oil phase or said water phase.

* * * * *